United States Patent [19]

Smith

[11] 4,077,456

[45] Mar. 7, 1978

[54] SIMPLIFIED VALVE FOR TUBELESS TIRE

[75] Inventor: Joseph W. Smith, Altavista, Va.

[73] Assignee: National Distillers and Chemical Corporation, New York, N.Y.

[21] Appl. No.: 736,289

[22] Filed: Oct. 28, 1976

[51] Int. Cl.² ............................................. B60C 29/00
[52] U.S. Cl. ..................................... 152/427; 141/38; 137/223
[58] Field of Search ............... 152/427, 428, 429, 415; 141/38; 137/223, 231

[56] References Cited

U.S. PATENT DOCUMENTS

| 3,032,091 | 5/1962 | McCord | 152/427 |
| 3,087,529 | 4/1963 | Morton | 152/427 |
| 3,258,051 | 6/1966 | Kilmarx | 152/427 |
| 3,511,295 | 5/1970 | Kilmarx | 152/427 |

Primary Examiner—Drayton E. Hoffman
Attorney, Agent, or Firm—Kenneth D. Tremain

[57] ABSTRACT

An extremely simple valve stem assembly for a tubeless tire and rim, comprising an elastomeric boot or flexible enclosure adapted to be inserted into a rim hole from one side thereof, and a hard plastic insert, which is specially configured to be joined with the boot, such insert being inserted from the opposite side of the rim so as to create a tight, mechanical fit, the dimensions being so proportioned that a perfect seal is established between the periphery of the boot and the rim by reason of boot expansion, as well as an extremely tight seal between the insert and the inner portion of the boot by virtue of compression between insert and rim.

3 Claims, 3 Drawing Figures

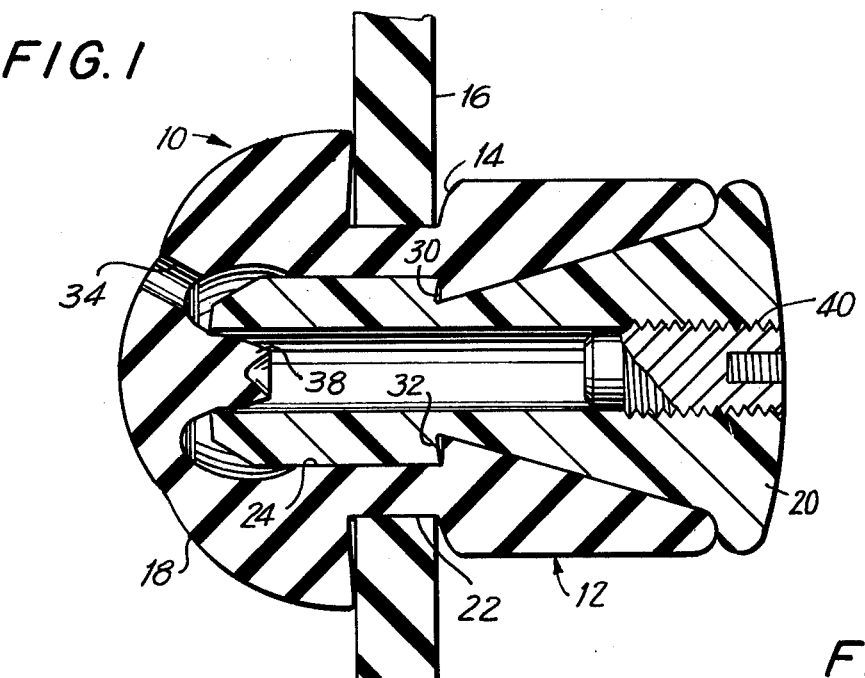
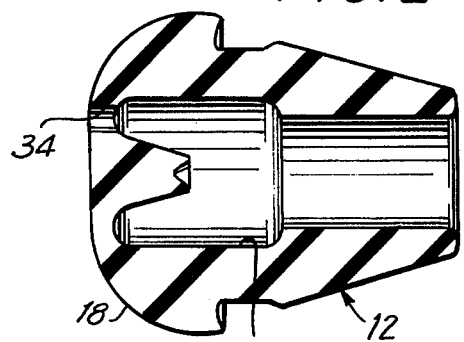
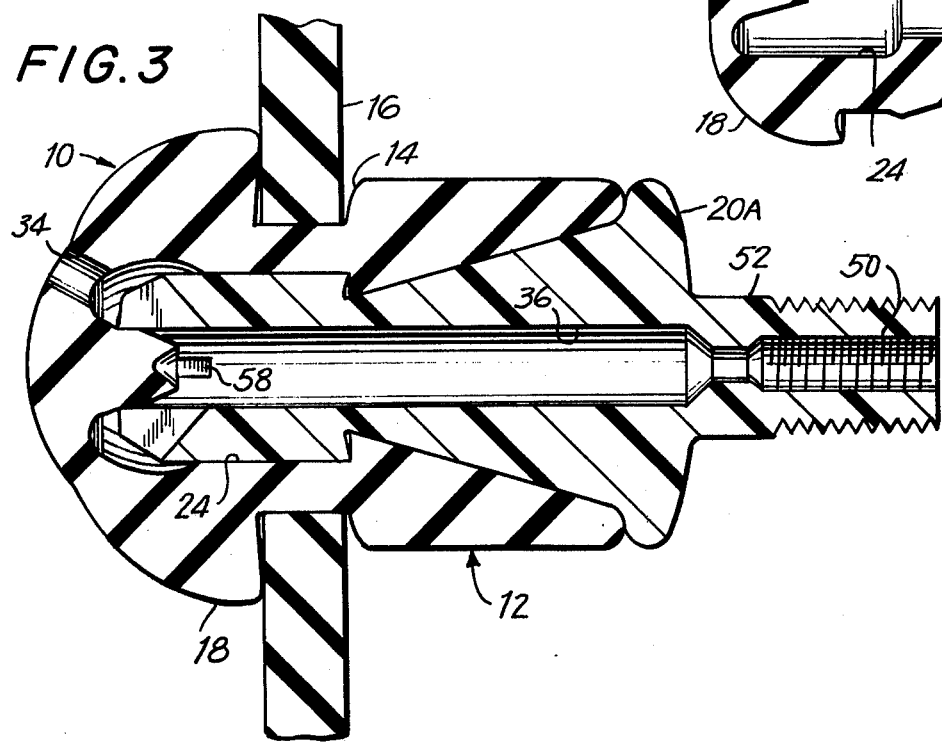

SIMPLIFIED VALVE FOR TUBELESS TIRE

BACKGROUND, OBJECTS AND SUMMARY OF THE INVENTION

The present invention pertains to a valve stem assembly which is adapted to make a perfect seal with a rim upon which a tubeless tire is to fitted.

A variety of valve stem assemblies have been known heretofore but, despite the relative simplicity of such assemblies, it has been found that they are rather expensive to manufacture and often depend for their effectiveness upon a rubber-to-metal bond which is often difficult to maintain.

In order to avoid the difficulty and expense involved with those valve assemblies which require a rubber-to-metal bond, a particular valve stem assembly has been developed involving the replacement of many of the expensive metal parts with molded plastic parts. As an example of such a molded valve assembly, reference may be made to U.S. Pat. No. 3,032,091.

Whatever the merits of the molded plastic valve assembly described in the aforesaid patent, it has been found that superior results can accomplished by a different approach to the arrangement of the parts of such a plastic valve assembly; that is, to an approach which makes it extremely difficult to remove the valve assembly once it has been fitted or sealed with the tire rim.

Another object of the present invention is to provide a molded plastic valve assembly that is adapted not only to make extremely difficult the withdrawal of the valve assembly by outwardly directed movement once such assembly has been mounted or set up on the rim, but, at the same time, to constrain any inwardly directed movement thereof. In other words, the valve assembly of the present invention is additionally immune to being forced further inwardly once it has been mounted and appropriately fitted to the tire rim.

In fulfilment of the above-stated objects, a primary feature of the present invention resides in the provision of an enlarged head portion for the aforesaid rubber or elastomeric boot forming the valve assembly. This boot is also formed with a cylindrical skirt portion which is joined to the enlarged head portion by a narrowed neck portion. Moreover, the outer surface of the cylindrical skirt portion is normally in a conical configuration; that is, in the relaxed state for the rubber boot, the periphery of the skirt portion has a conical shape, whereas the interior surface defines a hollow cylinder. However, once the insert has been inserted into the boot from the opposite direction from which the boot was fitted into the rim, the outer conical portion of the boot is compelled to conform with the shape of the insert, the result being that the outer periphery also becomes cylindrical. The consequence which is of significance to the present invention is that the peripheral surface of the boot immediately abutting against the rim at the outside functions to prevent movement of the entire assembly inwardly. In other words, a groove is defined thereby with the desired effect that insertion of the insert precludes untoward inwardly directed movement of the valve assembly.

In addition to insuring that the entire assemly cannot be moved in an undesired manner so as to cause a breaking of the established seal or fit with the rim, the forcing inwardly of the insert establishes the desired seal at the interior of the boot portion; that is to say, the seal between the inner end of the insert and a spherical protrusion provided at the boot's inner end, thereby preventing any escape of air through the bore of the insert. However, by one form of device or another, the spherical protrusion can be manipulated when required so as to allow air to flow through suitably provided passageways in the boot portion and thence into the insert bore.

Other and further objects, advantages and features of the present invention will be understood by reference to the following specification in conjunction with the annexed drawing, wherein like parts have been given like numbers.

BRIEF DESCRIPTION OF THE DRAWING

FIG. 1 is a sectional view of a valve stem assembly in accordance with the present invention shown fitted to a tire rim;

FIG. 2 is a sectional view of the boot member of the valve stem assembly, and particularly illustrating the normal or preassembled condition of such boot member; and FIG. 3 is another embodiment of the valve stem assembly, this embodiment including an extension on the insert such that a threaded cap can be secured thereon and a conventional valve core can be engaged therewith.

DESCRIPTION OF PREFERRED EMBODIMENTS

Referring now to the drawing and in particular for the moment to FIG. 1, there is illustrated a preferred embodiment of the valve stem assembly of the present invention, generally designated by numeral 10 and comprising a resilient rubber grommet or boot 12, such boot having a hardness of approximately 70 durometers. Accordingly such boot is of relatively soft material. The resilient boot preferably includes a circumferentially extending groove 14 which is developed or formed at the outer side of a rim 16 by the condition of the boot at that location. This particular configuration will be explained hereinafter. The groove is also defined at the inner side of the rim 16 by the fact that the rubber boot 12 is formed to have an enlarged head 18. The valve stem assembly 10 also includes a relatively hard plastic insert 20, preferably formed of nylon-like material.

It will be understood that in order to preclude ready withdrawal of the entire assembly, it is provided that the enlarged head 18 has a diameter appropriately larger than the diameter of a particular rim hole 22; whereas the limited diameter portion, that is, the necked down portion at which the groove 14 is defined, is of only slightly larger diameter than the rim hole 22. Thus, when the insert 20 is inserted within the main passageway or bore 24 of the boot 12, the resilient rubber of which the boot is constituted is fored outwardly so as to produce the required tight seal with the rim.

It will be appreciated by reference to FIG. 2 that the preassembled or normal state of the resilient boot 12 is a relaxed state in which the outer surface or periphery is conical in shape and with the groove 14 not well defined. When deformed, however, due to insertion of insert 20, the outer surface of boot 12 takes on a substantially cylindrical shape.

As will be seen in FIG. 1, the inner end of the plastic insert 20 is adapted to be retained within the inner portion of bore 24. In order to firmly secure the insert, a shoulder 30 is provided. The inner end of insert 20 is provided with a correspondingly barbed shoulder or flange 32 such that, once the insert has been placed in position to provide the seal required, it can no longer be withdrawn from boot 12.

Complete interior sealing or valving against flow of air is realized by virtue of the fact that interior passageways formed in the inner end of boot 12, that is, passageways 34, preferably three in number, are able to communicate with a bore 36 in insert 20 only if the spherical protrusion 38 of the head portion 18 is not abutting firmly with the inner end of the bore 36. Normally this abutting is accomplished when the insert has been fully inserted into boot 12. However, if it is desired to inflate or deflate, that is, to inject or remove air from the interior of the tire, then by use of a simple needle valve this can be readily accomplished. Thus a dust cap 40 is removed from the bore 36 and the typical needle is inserted into the bore 36 so as to engage the spherical protrusion 38 and pushing same inwardly so as to break the seal and to permit air flow, for example, from the interior passageways 34 into the bore 36 and thence to the atmosphere.

Referring now to FIG. 3, it will be seen that by a modification or slight change of the insert herewith designated by numeral 20A, an embodiment is provided which can utilize a standard automotive valve core instead of the aforenoted needle valve arrangement. Thus it will be seen in FIG. 3 that a valve core 50 is threadedly engaged at the interior of insert 20A. The insert 20A is modified so as to have an extension 52 which is also threaded on its outer surface so that a suitable dust cap can be engaged thereupon.

It will be appreciated that in this second embodiment the standard valve core 50 can serve as the valving means and can be operated in conventional manner by application of a valve chuck to the right end of the extension 52 so as to cause a conventional pin to permit communication from the atmosphere to the interior of bore 36. Also in this embodiment at the inner end of insert 20A slots 58 are introduced to allow equal or even greater air flow than the smallest restriction in the system. In other words, the previously operable seal is bypassed and the required sealing at the interior is now provided by the standard valve core 50.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

What is claimed is:

1. A valve assembly adapted to be fitted in an opening provided in a tire rim, said valve assembly comprising:

a resilient rubber boot adapted to be inserted from one side of said rim within said opening, said boot having a bore extending therethrough; a head portion, at the inner end of the boot, having an outside diameter substantially greater than the diameter of the opening in said rim so as to set a limit on the outwardly directed movement of said boot, said head portion being provided with passageways integrally formed therein for communication with said bore; a neck portion having a diameter less than the head portion, and a skirt portion which in its relaxed or normal state possesses a variable outside diameter whose magnitude decreases from the adjoining neck portion to the outer end of said boot;

a rigid insert adapted to be inserted from the opposite side of said rim within the bore of said boot and to engage with a spherical protrusion at the interior of said head portion, said insert having a conical shape at its outer end and a cylindrical shape at its inner end, with a flange defined at the point of transition; said flange engaging with a shoulder formed in the bore of said boot, the conical shape at the outer end of the insert being such as to provide an increasing diameter outwardly, thereby serving to deform the periphery of the resilient boot at its outer end and produce a well-defined groove abutting the opening in said rim so as to prevent inwardly directed movement of the valve assembly.

2. A valve assemly as defined in claim 1, in which a bore formed in said insert is adapted to receive said spherical protrusion at its inner end and to receive a valve manipulating device at its outer end.

3. A valve assembly as defined in claim 2, in which slots are provided at the inner end of said insert so that the valve defined by the abutment of said spherical protrusion at the inner end of the bore of side insert can be bypassed.

* * * * *